(12) United States Patent
Takatani (10) Patent No.: US 8,730,496 B2
(45) Date of Patent: May 20, 2014

(54) INFORMATION PROCESSING APPARATUS, IMAGE PROCESSING APPARATUS, AND CONTROL METHOD THEREFOR, AS WELL AS A PROGRAM

(75) Inventor: Tamotsu Takatani, Yokohama (JP)

(73) Assignee: Canon Kabushiki Kaisha (JP)

( * ) Notice: Subject to any disclaimer, the term of this patent is extended or adjusted under 35 U.S.C. 154(b) by 1200 days.

(21) Appl. No.: 12/101,151

(22) Filed: Apr. 11, 2008

(65) Prior Publication Data

US 2008/0252928 A1    Oct. 16, 2008

(30) Foreign Application Priority Data

Apr. 12, 2007   (JP) ................................. 2007-105031

(51) Int. Cl.
| | | |
|---|---|---|
| G06F 3/12 | (2006.01) | |
| G06K 15/00 | (2006.01) | |
| G06F 15/16 | (2006.01) | |

(52) U.S. Cl.
USPC ......... 358/1.15; 358/1.14; 358/1.16; 709/203

(58) Field of Classification Search
USPC ....................................... 358/1.15
See application file for complete search history.

(56) References Cited

U.S. PATENT DOCUMENTS

| | | | | |
|---|---|---|---|---|
| 6,307,640 | B1 * | 10/2001 | Motegi ......................... | 358/1.14 |
| 7,324,233 | B2 * | 1/2008 | Shima et al. ................. | 358/1.15 |
| 7,646,499 | B2 * | 1/2010 | Hayakawa .................... | 358/1.14 |
| 7,768,664 | B2 | 8/2010 | Asano | |
| 7,952,733 | B2 | 5/2011 | Oka | |
| 2003/0231329 | A1 * | 12/2003 | Edmonds et al. ............. | 358/1.13 |
| 2004/0021893 | A1 * | 2/2004 | Stevens et al. ................ | 358/1.15 |
| 2007/0234400 | A1 * | 10/2007 | Yanagi ............................... | 726/1 |
| 2008/0018924 | A1 * | 1/2008 | White et al. .................. | 358/1.13 |
| 2008/0049246 | A1 * | 2/2008 | Kim .............................. | 358/1.15 |
| 2008/0055627 | A1 * | 3/2008 | Ellis ............................. | 358/1.14 |
| 2008/0068642 | A1 * | 3/2008 | Takahashi ..................... | 358/1.15 |

FOREIGN PATENT DOCUMENTS

| | | |
|---|---|---|
| JP | 2004-30568 A | 1/2004 |
| JP | 2005-086559 A | 3/2005 |
| JP | 2006-33086 A | 2/2006 |
| JP | 2007-060631 A | 3/2007 |

OTHER PUBLICATIONS

Japanese Office Action for corresponding JP 2007-105031, dated Nov. 15, 2011.

* cited by examiner

*Primary Examiner* — Benny Q Tieu
*Assistant Examiner* — Sunil Chacko
(74) *Attorney, Agent, or Firm* — Rossi, Kimms & McDowell, LLP

(57) ABSTRACT

An information processing apparatus connected to a plurality of image processing apparatuses via a network, comprising, a transmission unit configured to transmit identification information for identifying the information processing apparatus on the network and specifying information by which a user identifies the information processing apparatus to the plurality of image processing apparatuses on the network, and a reception unit configured to be operable when the user selects the specifying information in one of the plurality of image processing apparatuses, to receive information for using the selected image processing apparatus transmitted from the selected image processing apparatus based on the identification information.

15 Claims, 10 Drawing Sheets

- 401
- 402 SEARCH REQUEST HEADER
- 403 SENDER'S IP ADDRESS
- 404 KEYWORD
- 405 PASSWORD AUTHENTICATION ON/OFF-SETTING

FIG. 5

| KEYWORD | IP ADDRESS | PASSWORD AUTHENTICATION ON/OFF-SETTING |
|---------|------------|----------------------------------------|
| tanaka  | 172.24.32.136 | ○ |
| hayashi | 172.25.30.22  | × |
| ***     | ***        | *** |

502 — KEYWORD
503 — IP ADDRESS
504 — PASSWORD AUTHENTICATION ON/OFF-SETTING
501

INFORMATION PROCESSING APPARATUS, IMAGE PROCESSING APPARATUS, AND CONTROL METHOD THEREFOR, AS WELL AS A PROGRAM

BACKGROUND OF THE INVENTION

1. Field of the Invention

The present invention relates to an information processing apparatus and an image processing apparatus interconnected via a network, and a control method therefor, as well as a program for implementing the control method.

2. Description of the Related Art

In an information processing system including information processing apparatuses (personal computers) and printing apparatuses interconnected via a network, an information processing apparatus transmits print data described e.g. in the PDL (Page Description Language) to a printing apparatus through the network. When receiving the print data from the information processing apparatus, the printing apparatus converts the received print data into bitmap data, and then outputs the bitmap data.

In order that a personal computer (hereinafter referred to as "the PC") can use a printing apparatus on the network, the PC is required to register information on the printing apparatus therein in advance. For example, the PC has to know the network address of the printing apparatus so as to communicate with the printing apparatus via the network. Further, in order to generate PDL data, it is required to install a printer driver compatible with the printing apparatus.

In a case where a plurality of printing apparatuses are connected to the network, a user is required to select a desired one from the printing apparatuses and acquire and register information on the selected printing apparatus.

There has been proposed a technique for an information processing system of the above-mentioned kind in Japanese Patent Laid-Open Publication (Kokai) No. 2006-33086, in which information for inquiring of printing apparatuses on a network whether the printing apparatuses are equipped with a desired function is broadcast from a PC, and then the PC lists up apparatuses having responded to the inquiry so that the user can select a desired apparatus.

Further, there has been proposed another technique in Japanese Patent Laid-Open Publication No. 2004-30568, in which installation components are broadcast from a printing apparatus connected to PCs on the same network, whereby the components are installed on the PCs.

However, in the method disclosed in Japanese Patent Laid-Open Publication No. 2006-33086, in a case where a large number of printing apparatuses are connected to the network, it is difficult for a user to identify a desired printing apparatus from the apparatus list. This is because even when the desired printing apparatus is presented to the user, if the user does not know the IP address or apparatus name of the printing apparatus, it is impossible to identify the desired printing apparatus from the displayed list. Further, when the user is not informed of functions of the printing apparatus, it is impossible to narrow down the list based on the function. If the printing apparatus cannot be identified, it is impossible to register information on the printing apparatus in the PC, and hence the user cannot use the printing apparatus via the PC.

On the other hand, the method disclosed in Japanese Patent Laid-Open Publication No. 2004-30568 suffers from a problem that the installation components broadcast from a printing apparatus are sent not only to PCs of users who use the printing apparatuses, but also to the other computers which do not belong to such users.

SUMMARY OF THE INVENTION

The present invention provides an information processing apparatus which is capable of acquiring information on a desired image processing apparatus more easily and an image processing apparatus which enables the information to be acquired by the image processing apparatus more easily.

In a first aspect of the present invention, there is provided an information processing apparatus connected to a plurality of image processing apparatuses via a network, comprising a transmission unit configured to transmit identification information for identifying the information processing apparatus on the network and specifying information by which a user identifies the information processing apparatus to the plurality of image processing apparatuses on the network, and a reception unit configured to be operable when the user selects the specifying information in one of the plurality of image processing apparatuses, to receive information for using the selected image processing apparatus transmitted from the selected image processing apparatus based on the identification information.

According to the first aspect of the present invention, it is possible to facilitate a user operation for causing an information processing apparatus to acquire information on a desired image processing apparatus.

The information processing apparatus further comprises a second transmission unit configured to be operable when the reception unit receives the information on the selected image processing apparatus, to transmit an instruction for deleting the identification information and the specifying information transmitted by the transmission unit from a storage unit in each of the plurality of image processing apparatuses, to the plurality of image processing apparatuses.

When a user selects the specifying information in one of the plurality of image processing apparatuses, the transmission unit can transmit a setting for requesting the user to enter a password, together with the identification information and the specification information.

The identification information can be a network address of the information processing apparatus.

The specifying information can be information input by the user.

The information for using the selected image processing apparatus can include at least a network address of the image processing apparatus.

In a second aspect of the present invention, there is provided an image processing apparatus comprising a reception unit configured to receive from an information processing apparatus connected to the image processing apparatus via a network, identification information for identifying the information processing apparatus on the network and specifying information by which a user identifies the information processing apparatus, a display unit configured to display the specifying information received by the reception unit, and a transmission unit configured to be operable when the specifying information displayed by the display unit is selected by a user, to transmit information for using the image processing apparatus based on the identification information received by the reception unit to the information processing apparatus.

The image processing apparatus further comprises a storage unit configured to store the identification information and the specifying information received by the reception unit, and a deleting unit configured to be operable when the specifying information has not been selected by a user for a predetermined time period after the identification information and the specifying information were received by the reception unit, to delete the identification information and the specifying information from the storage unit.

The image processing apparatus comprises a storage unit configured to store the identification information and the specifying information received by the reception unit, a second reception unit configured to receive from the information processing apparatus, an instruction for deleting the identification information and the specifying information from the storage unit, and a deleting unit configured to be operable when the instruction is received by the second reception unit, to delete the identification information and the specifying information from the storage unit.

The image processing apparatus further comprises a second display unit configured to be operable when the specifying information displayed by the display unit is selected by a user, to display a screen for requesting the user to enter a password.

The identification information can be a network address of the information processing apparatus.

The specifying information can be information input by the user.

The information for using the image processing apparatus can include at least a network address of the image processing apparatus.

In a third aspect of the present invention, there is provided a method of controlling an information processing apparatus connected to a plurality of image processing apparatuses via a network, comprising a transmission step of transmitting identification information for identifying the information processing apparatus on the network and specifying information by which a user identifies the information processing apparatus to the plurality of image processing apparatuses on the network, and a reception step of operating when the user selects the specifying information in one of the plurality of image processing apparatuses, to receive information for using the selected image processing apparatus transmitted from the selected image processing apparatus based on the identification information.

In a fourth aspect of the present invention, there is provided a program for causing a computer to execute a method of controlling an information processing apparatus connected to a plurality of image processing apparatuses via a network, comprising a transmission module for transmitting identification information for identifying the information processing apparatus on the network and specifying information by which a user identifies the information processing apparatus to the plurality of image processing apparatuses on the network, and a reception module for operating when a user selects the specifying information in one of the plurality of image processing apparatuses, to receive information for using the selected image processing apparatus transmitted from the selected image processing apparatus based on the identification information.

In a fifth aspect of the present invention, there is provided a method of controlling an image processing apparatus, comprising a reception step of receiving from an information processing apparatus connected to the image processing apparatus via a network, identification information for identifying the information processing apparatus on the network and specifying information by which a user identifies the information processing apparatus, a display step of displaying the specifying information received in the reception step, and a transmission step of operating when the specifying information displayed in the display step is selected by a user, to transmit information for using the image processing apparatus based on the identification information received in the reception step to the information processing apparatus.

The features and advantages of the invention will become more apparent from the following detailed description taken in conjunction with the accompanying drawings.

BRIEF DESCRIPTION OF THE DRAWINGS

FIGS. BA to 8C are views of interfaces displayed on a screen of the printing apparatus appearing in FIGS. 1A and 1B.

DETAILED DESCRIPTION OF THE EMBODIMENTS

The present invention will now be described in detail with reference to the drawings showing a preferred embodiment thereof.

Figure 1A:
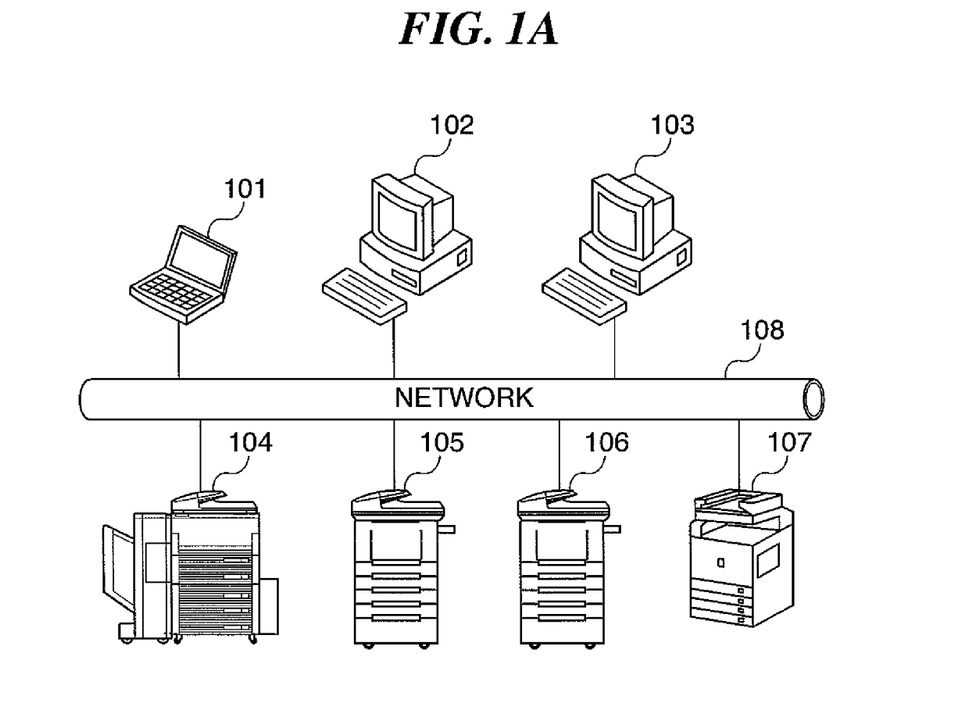
FIG. 1A is a conceptual view of the overall configuration of an information processing system according to an embodiment of the present invention.

FIG. 1A is a conceptual view of the overall configuration of an information processing system according to the embodiment of the present invention.

As shown in FIG. 1A, the information processing system includes personal computers (PCs) 101, 102, and 103 as information processing apparatuses provided with respective network interfaces.

Further, the information processing system includes a printing apparatus 104 provided with a network interface and a scanner function, and printing apparatuses 105, 106, and 107 each provided with a network interface, but not with a scanner function.

The PCs 101, 102, and 103 and the printing apparatuses 104, 105, 106, and 107 form a LAN (Local Area Network) interconnected via a network 108.

A user who utilizes the present system searches for one of the printing apparatuses 104, 105, 106, and 107 via one of the PCs 101, 102, and 103.

Figure 1B:
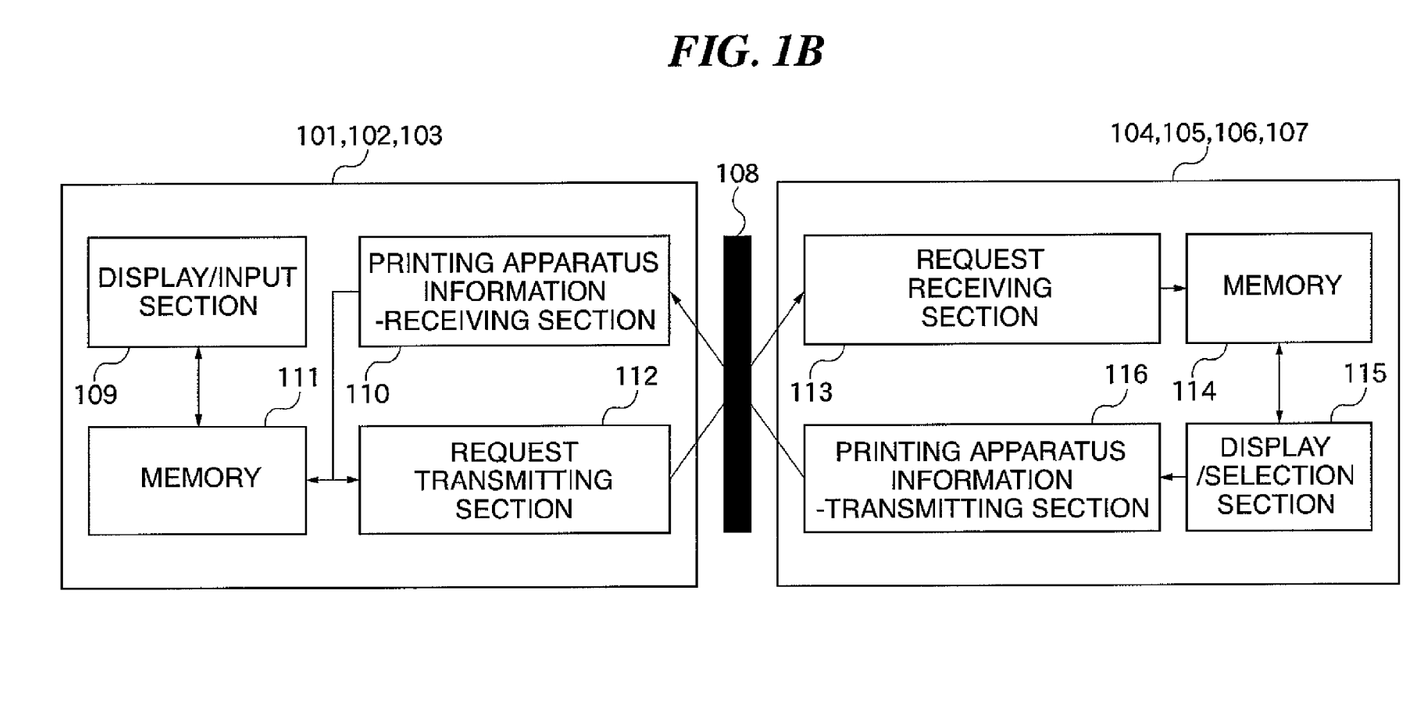
FIG. 1B is a block diagram of the internal configuration of a personal computer (PC) appearing in FIG. 1A and that of a printing apparatus appearing in FIG. 1A.

FIG. 1B is a block diagram of the internal configuration of the PC appearing in FIG. 1A and that of the printing apparatus appearing in FIG. 1A.

As shown in FIG. 1B, the PC 101 (the PCs 102 and 103 are similarly configured and hence hereinafter the PC 101 represents all of them) is comprised of a display/input section 109, a printing apparatus information-receiving section (reception unit) 110, a memory (storage unit) 111, and a request transmitting section (transmission unit, second transmission unit) 112.

The display/input section 109 performs display according to a program, and accepts a user input so as to generate a printing apparatus search request on the PC 101. The printing apparatus information-receiving section 110 receives information from the printing apparatus 104 (the printing apparatuses 105 to 107 are similarly configured, and hence hereinafter the printing apparatus 104 represents all of them).

The memory 111 stores the IP address of the PC 101 as an identifier thereof on the network 108, information sent from the printing apparatus 104, and programs for operating the present system.

The request transmitting section 112 broadcasts the printing apparatus search request to the apparatuses on the network 108 when instructed to send the request by the user on the PC 101.

The printing apparatus 104 is comprised of a request receiving section (reception unit, second reception unit) 113, a memory 114, a display/selection section (display unit, second display unit) 115, and a printing apparatus information-transmitting section 116.

The request receiving section 113 receives the printing apparatus search request from the PC 101, and stores the IP address of the PC 101, a keyword associated with the same, and the like in the memory 114.

The memory 114 stores information sent from the PC 101 (a search request list 501, described hereinafter) including the IP address of the PC 101, the IP address of the printing apparatus 101 as an identifier thereof on the network 108, and programs for operating the present system.

The display/selection section 115 displays a keyword input by the user on the PC 101, and the user selects the keyword.

The printing apparatus information-transmitting section 116 transmits information based on the IP address of the PC 101 stored in the memory 114, when the printing apparatus 104 receives a user request.

Figure 2:
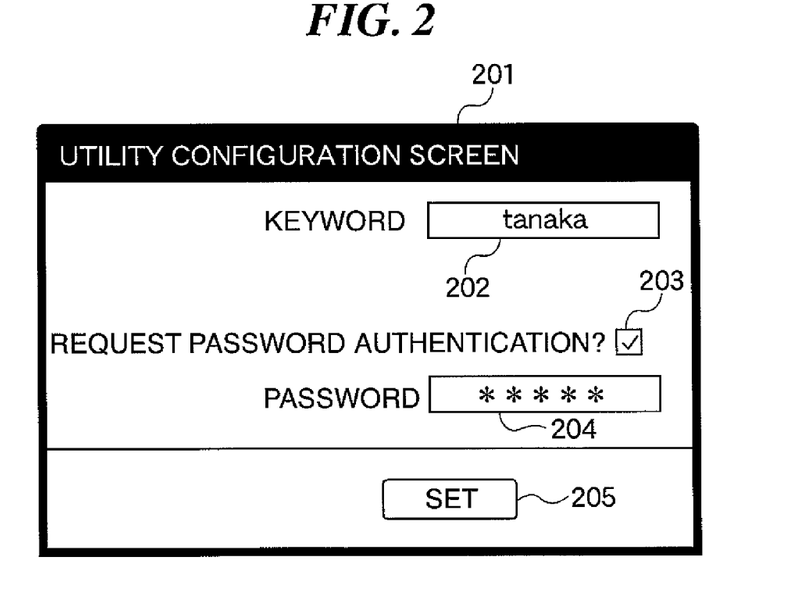
FIG. 2 is a view of a configuration screen of a program operating on the PC appearing in FIGS. 1A and 1B.

FIG. 2 is a view of a configuration screen of a program operating on the PC appearing in FIGS. 1A and 1B.

The configuration screen 201 is comprised of a keyword input box 202, a password authentication check box 203, a password input box 204, and a configuration confirmation button 205.

In the keyword input box 202, the user inputs a keyword as specifying information for specifying the PC 101 on the printing apparatus 104. The keyword may be a character string the user can input as desired, or it may be configured such that information, such as the PC name or IP address of the PC 101, is automatically input.

The password authentication check box 203 is checked when the user desires to perform password authentication in a case where the PC 101 is selected from the printing apparatus 104. The password authentication prevents access to the PC 101 by a third party.

In the password input box 204, a password for access to the PC 101 can be set. When the user selects a keyword on the printing apparatus 104, the user has to correctly enter the password set in the password input box 204. When the password authentication check box 203 is not checked, the password input box 204 is grayed out so as to inhibit user input.

The configuration confirmation button 205 is pressed to finalize the setting of the keyword and the password and reflect the setting in a configuration file.

Figure 3:
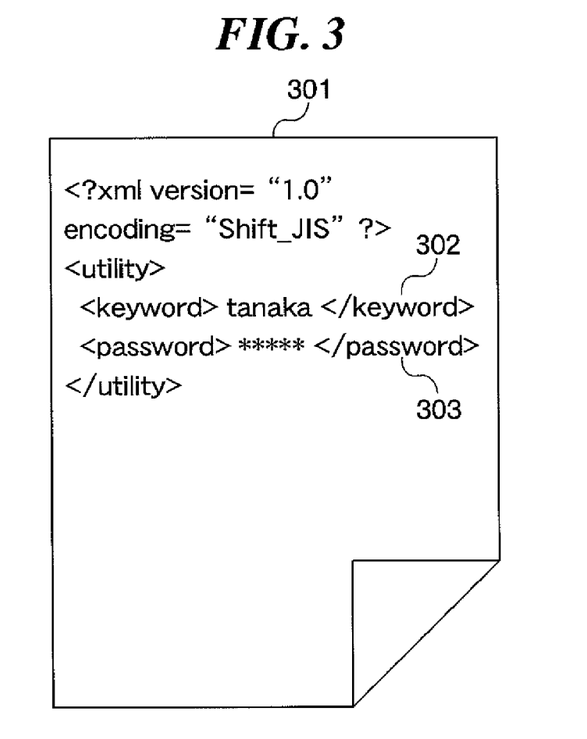
FIG. 3 is a view of a configuration file of the program operating on the PC appearing in FIGS. 1A and 1B.

FIG. 3 is a view of the configuration file of the program operating on the PC appearing in FIGS. 1A and 1B. In the present embodiment, the configuration file is described using XML.

As shown in FIG. 3, the configuration file 301 is comprised of a keyword data portion 302, and a password data portion 303.

The keyword data portion 302 holds a value input in the keyword input box 202. The password data portion 303 holds a value input in the password input box 204. When the password authentication check box 203 is not checked, front and rear tags <password> and </password> of the password data portion 303 are deleted.

Figure 4:
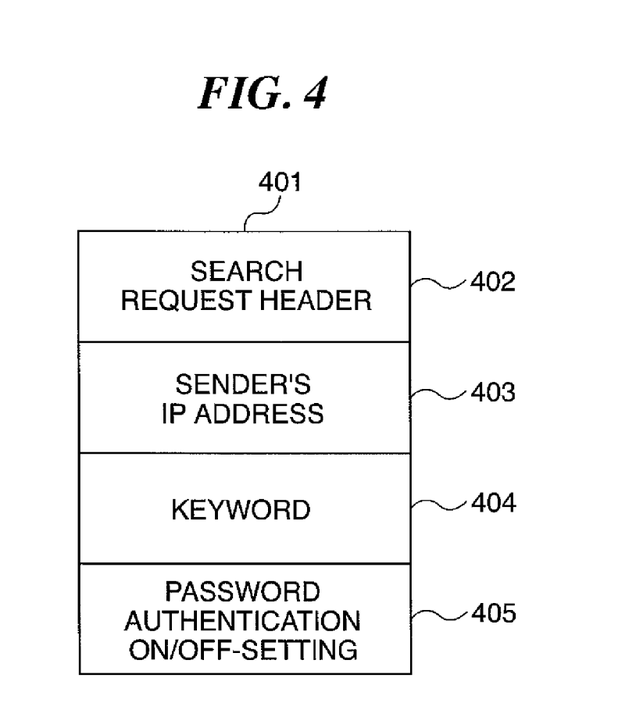
FIG. 4 is a diagram of the data structure of a printing apparatus search request packet sent from the PC appearing in FIGS. 1A and 1B to the printing apparatus appearing in FIGS. 1A and 1B.

FIG. 4 is a diagram of the data structure of a printing apparatus search request packet sent from the PC appearing in FIGS. 1A and 1B to the printing apparatus appearing in FIGS. 1A and 1B.

As shown in FIG. 4, the printing apparatus search request packet 401 is comprised of a search request header section 402, a sender's IP address section 403, a keyword section 404, and a password authentication ON/OFF-setting section 405.

The search request header section 402 is a specific header indicating that the present packet is the printing apparatus search request packet 401. The printing apparatus 104 has a program for executing a predetermined process upon reception of the search request header section 402.

The sender's IP address section 403 indicates identification information for uniquely identifying the PC 101 that sends the printing apparatus search request packet 401 on the network. It should be noted that this identification information is not limited to an IP address, but it may be another kind of network address or an E-mail address.

In the keyword section 404, a value of the keyword data portion 302 described in the configuration file 301 is set when the printing apparatus search request packet 401 is to be transmitted.

In the password authentication ON/OFF-setting section 405, a value of the password data portion 303 described in the configuration file 301 and information indicative of whether password authentication is required or not (ON/OFF) are set when the printing apparatus search request packet 401 is to be transmitted.

Figure 5:
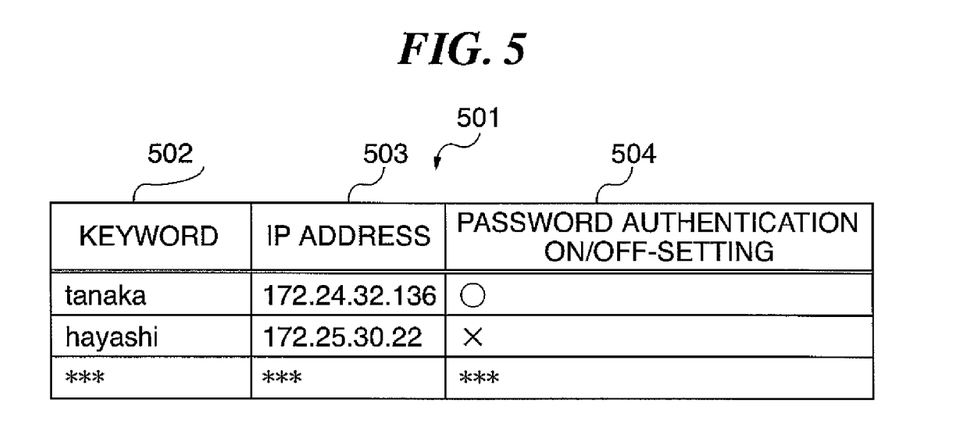
FIG. 5 is a diagram of the data structure of data which holds the contents of printing apparatus search requests from PCs and is stored in the printing apparatus appearing in FIGS. 1A and 1B.

FIG. 5 is a diagram of the data structure of data which holds the contents of printing apparatus search requests from respective PCs and is stored in the memory 114 of the printing apparatus appearing in FIGS. 1A and 1B.

As shown in FIG. 5, the search request list 501 is comprised of a keyword section 502, an IP address section 503, and a password authentication ON/OFF-setting section 504.

Whenever a printing apparatus search request packet 401 is received from the PC 101, the printing apparatus 104 stores the contents of the received packet 401 in the search request list 501. An item of the search request list 501 is deleted therefrom under a predetermined condition, described hereinafter, such as completion of search or timeout.

The keyword section 502 holds data of the keyword section 404 of the printing apparatus search request packet 401.

The IP address section 503 holds data of the IP address section 403 of the printing apparatus search request packet 401.

The password authentication ON/OFF-setting section 504 holds data of the password authentication ON/OFF-setting section 405 of the printing apparatus search request packet 401.

Figure 6:
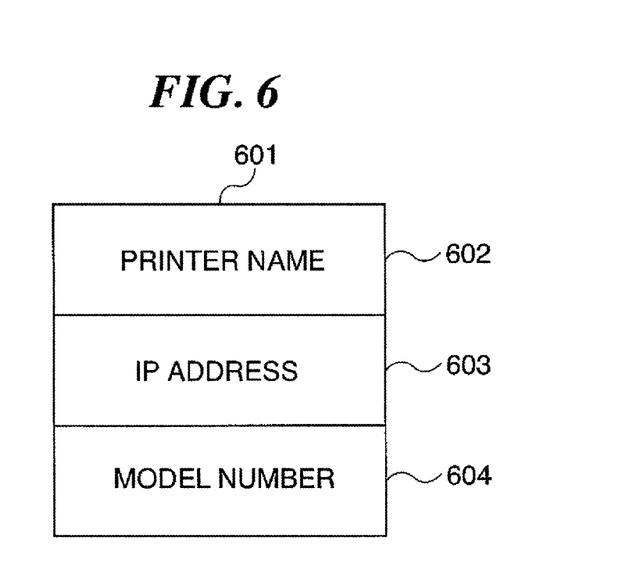
FIG. 6 is a diagram of the data structure of a packet sent from the printing apparatus appearing in FIGS. 1A and 1B to the PC appearing in FIGS. 1A and 1B, as a response to the printing apparatus search request sent from the PC to the printing apparatus.

FIG. 6 is a diagram of the data structure of a printing apparatus information packet sent from the printing apparatus appearing in FIGS. 1A and 1B to the PC appearing in FIGS. 1A and 1B, as a response to the printing apparatus search request sent from the PC to the printing apparatus.

As shown in FIG. 6, the printing apparatus information packet 601 includes at least a printer name section 602, an IP address section 603, and a model number section 604.

The printer name section 602 indicates a printer name assigned to the printing apparatus 104 for identifying the same.

The IP address section 603 indicates identification information assigned to the printing apparatus 104 for uniquely identifying the printing apparatus 104 on the network 108.

The model number section 604 indicates a model-specific model number assigned to the printing apparatus 104 for identifying the model of the same.

Further, the printing apparatus information packet may include a printer driver name or a printer driver itself associated with the printing apparatus 104. Whether or not the printing apparatus information packet 601 is caused to contain the printer driver may be switched according to user selection.

Furthermore, the printing apparatus information packet may include information indicative of functions of the printing apparatus 104 and other printing apparatus information.

Figure 7:
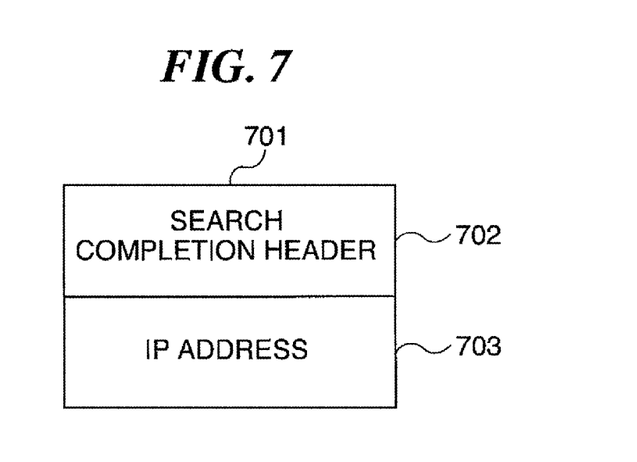
FIG. 7 is a diagram of the data structure of a printing apparatus search completion packet sent from the PC appearing in FIGS. 1A and 1B to the printing apparatus appearing in FIGS. 1A and 1B.

FIG. 7 is a diagram of the data structure of a printing apparatus search completion packet sent from the PC appearing in FIGS. 1A and 1B to the printing apparatus appearing in FIGS. 1A and 1B.

As shown in FIG. 7, the printing apparatus search completion packet 701 is comprised of a search completion header section 702 and an IP address section 703.

The search completion header section 702 is a specific header indicating that the present packet is the printing apparatus search completion packet 701. The printing apparatus 104 has a program for executing a predetermined process upon reception of the search completion header section 702.

The IP address section 703 indicates an identifier for uniquely identifying the PC 101 from which the printing apparatus search completion packet 701 is sent.

Figure 8A:
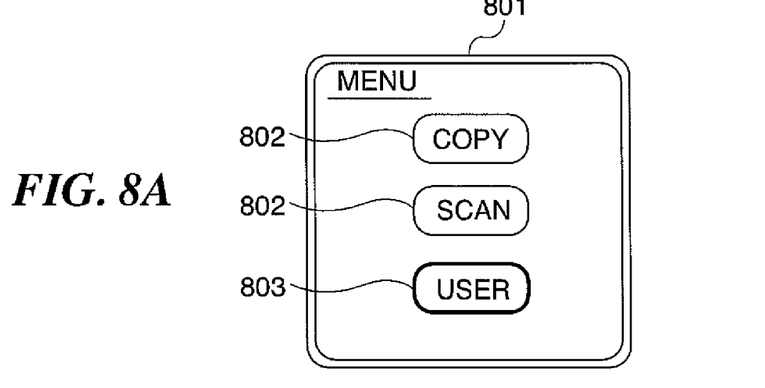
Figure 8B:
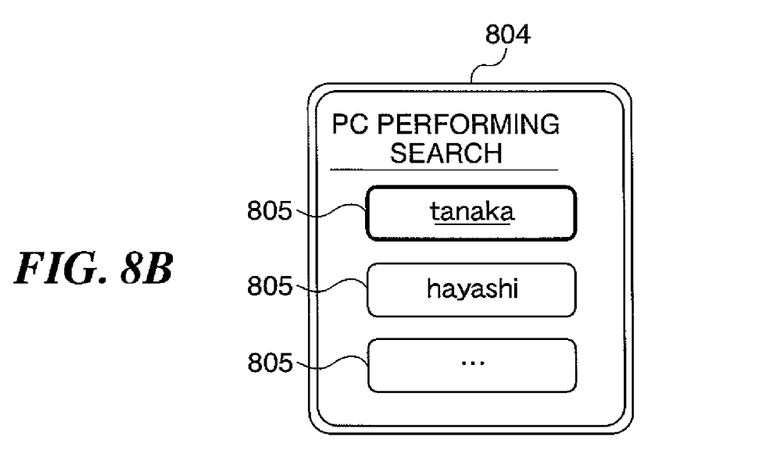
Figure 8C:
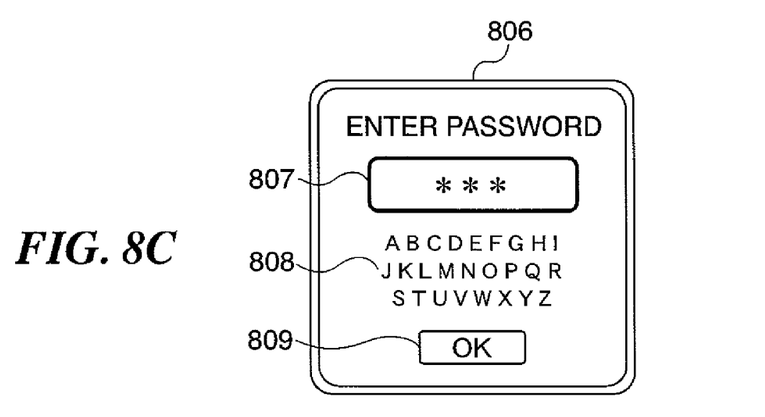

FIGS. 8A to 8C are views of interfaces displayed on a screen of the printing apparatus appearing in FIGS. 1A and 1B.

The user gives instructions to the printing apparatus 104 via the interfaces to operate the program.

Referring to FIG. 8A, a menu screen 801 of the printing apparatus 104 displays in a menu display section 802 a list of functions that can be realized by the printing apparatus 104. The user selects a desired function from the menu display section 802.

If at least one item exists in the search request list 501 of the printing apparatus 104, a "user" button 803 is displayed on the menu screen 801. On the other hand, if no item exists in the search request list 501, the "user" button 803 is not displayed on the menu screen 801. When the "user" button 803 is selected and pressed, a keyword list display screen 804 shown in FIG. 8B is displayed.

The keyword list display screen 804 shown in FIG. 8B is comprised of one or more keyword display sections 805. In the keyword display sections 805, keywords associated with all items added to the search request list 501 are displayed. When one of the keywords is selected and pressed by the user, a password entry screen 806 shown in FIG. 8C is displayed.

The password entry screen 806 shown in FIG. 8C is comprised of a password entry section 807, a password entry key section 808, and an OK button 809.

The password entry section 807 displays a password entered by the user. The password is displayed only as a series of asterisks from the viewpoint of security. The password entry key section 808 is used for password entry by the user.

The OK button 809 is pressed by the user when user input is completed. When the entry of a password is finalized, an authentication request is sent to the PC 101. The password is encrypted before transmission from the viewpoint of security.

The printing apparatus search request packet 401 is broadcast from the PC as described hereinafter. Therefore, the screens 801 and 804 shown in FIGS. 8A and 8B are displayed on a plurality of printing apparatuses. For this reason, by setting the requirement of inputting a password, the user can prevent a third party from designating a keyword and carrying out processing, without permission, by a different printing apparatus from one the user designated.

Figure 9:
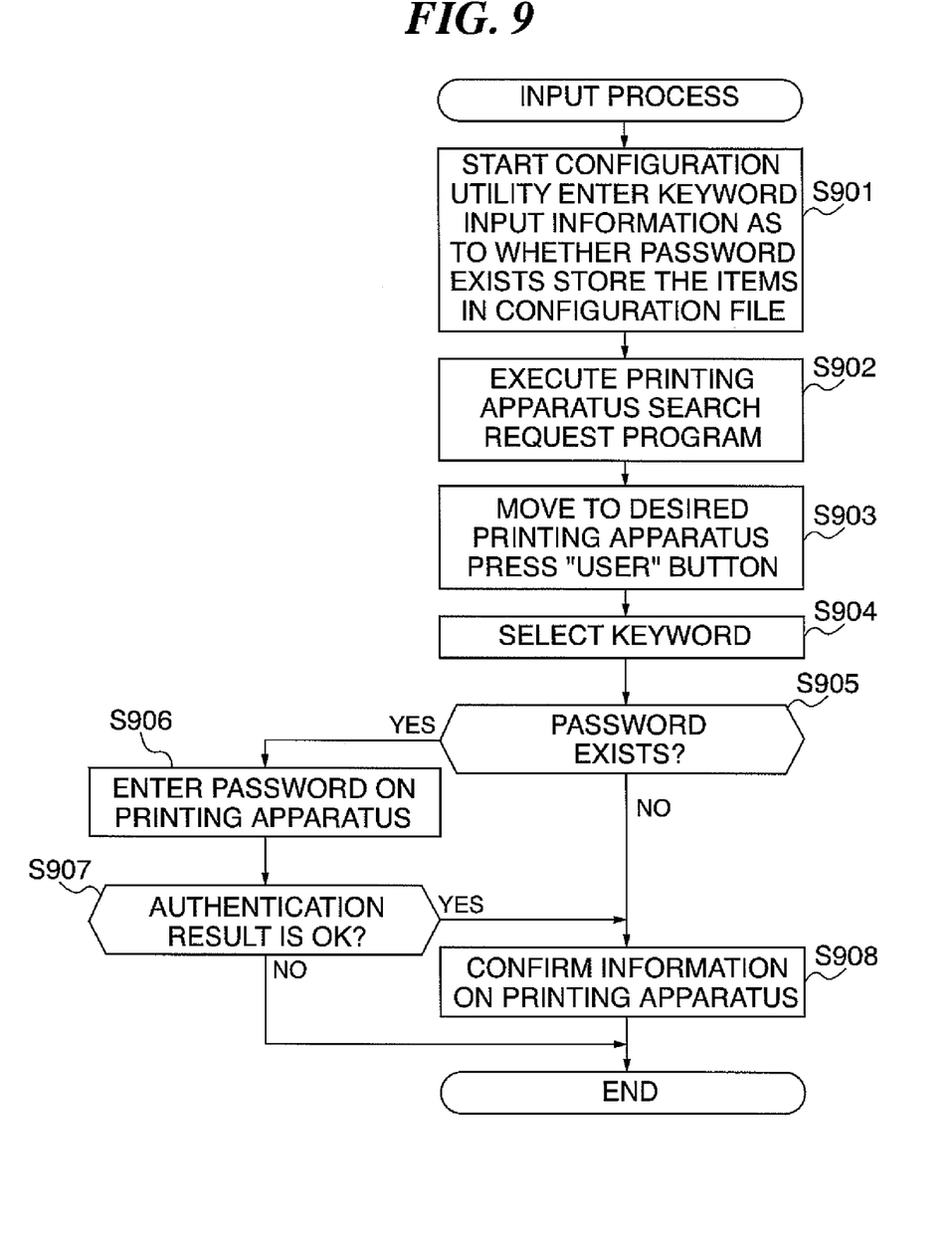
FIG. 9 is a flowchart of an input process executed for a PC and a printing apparatus of the information processing system shown in FIG. 1.

FIG. 9 is a flowchart of an input process carried out by a user in the information processing system according to the present embodiment so as to cause the PC to acquire information on a desired printing apparatus.

Referring to FIG. 9, in a step S901, the user operates the PC 101 to edit a printing apparatus search request packet to be transmitted in search for the printing apparatus 104, using the configuration screen 201. More specifically, the printing apparatus search request packet is edited by inputting a keyword, setting whether or not password authentication is required, and inputting a password, if the password authentication required. The PC 101 stores the items set in the step S901 in the configuration file 301.

In a step S902, the user causes the PC 101 to execute a printing apparatus search request program. In a step S903, the user moves to the printing apparatus 104 the user desires to use. Then, the user operates the printing apparatus 104 to press the "user" button 803 displayed on the menu screen 801.

In a step S904, the user operates the printing apparatus 104 to select the keyword set by him/herself from keywords displayed in the keyword list display screen 804.

In a step S905, the printing apparatus 104 refers to the search request list 501 held therein, and acquires information as to whether or not password association is required (in the password authentication ON/OFF-setting section 504). If the password authentication is required, the process proceeds to a step S906, whereas if not, the process proceeds to a step S908.

In the step S906, the user operates the printing apparatus 104 to enter the password in the password entry screen displayed in the display/selection section 115 of the printing apparatus 104.

In the step S907, the printing apparatus 104 acquires the result of the authentication of the password entered in the step S906. If the result of the authentication was OK, the process proceeds to a step S908, whereas if not, the present program is terminated.

In the step S908, the user confirms on his/her own PC 101 that information on the printing apparatus 104 has been transmitted from the printing apparatus 104, followed by terminating the program.

Figure 10:
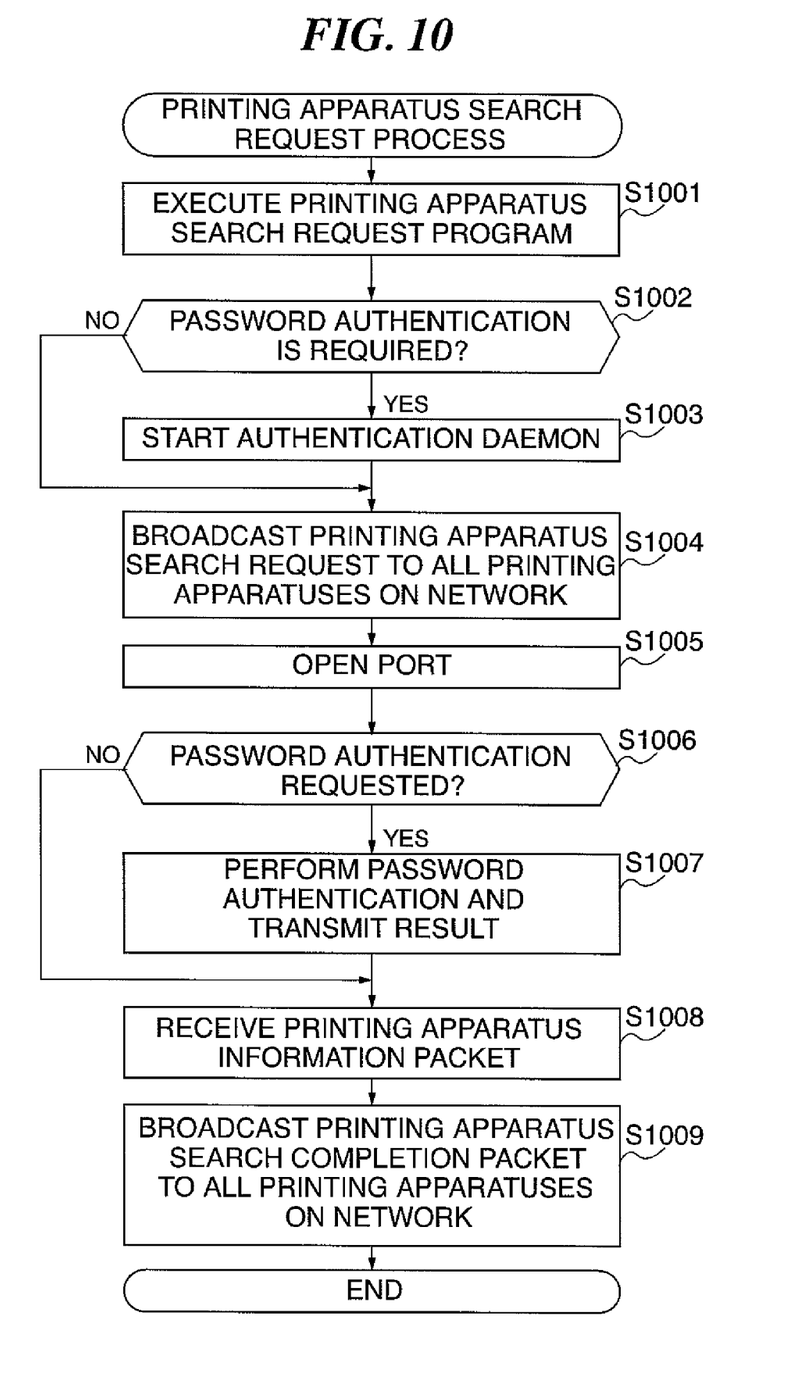
FIG. 10 is a flowchart of a printing apparatus search request process executed according to a program operating on the PC appearing in FIGS. 1A and 1B.

FIG. 10 is a flowchart of a printing apparatus search request process executed according to a program operating on the PC appearing in FIGS. 1A and 1B.

Referring to FIG. 10, in a step S1001, the present program is executed in response to an instruction from the user.

In a step S1002, information as to whether or not the password authentication associated with the keyword selected in the step S904 is required (in the password authentication ON/OFF-setting section 504) is acquired from the search request list 501. If the password authentication is required, the process proceeds to a step S1003, whereas if not, the process proceeds to a step S1004.

In the step S1003, a password authentication daemon is started for performing password authentication associated with the keyword, in the present program.

In the step S1004, a printing apparatus search request is broadcast to all the apparatuses on the network 108. In this step, data transmitted in this step is the printing apparatus search request packet 401.

In a step S1005, a port used for execution of a program by the printing apparatus 104 is opened. The PC 101 acquires information from the printing apparatus 104 via the port.

In a step S1006, a request transmitted from the printing apparatus 104 and having reached the port opened in the step S1005 is received. If the received information is a password authentication request, the process proceeds to a step S1007, whereas if the received information is printing apparatus information, the process proceeds to a step S1008.

In the step S1007, the received data is passed to the password authentication daemon started in the step S1003. The password authentication daemon decrypts the received data, and checks the decrypted data against the password data portion 303 of the configuration file 301, followed by sending the result of the password authentication to the printing apparatus 104.

In the step S1008, the printing apparatus information packet 601 sent from the printing apparatus 104 is received.

In a step S1009, a printing apparatus search completion packet is broadcast to all the information processing apparatuses on the network 108. In this step, the printing apparatus search completion packet 701 is transmitted.

Figure 11:
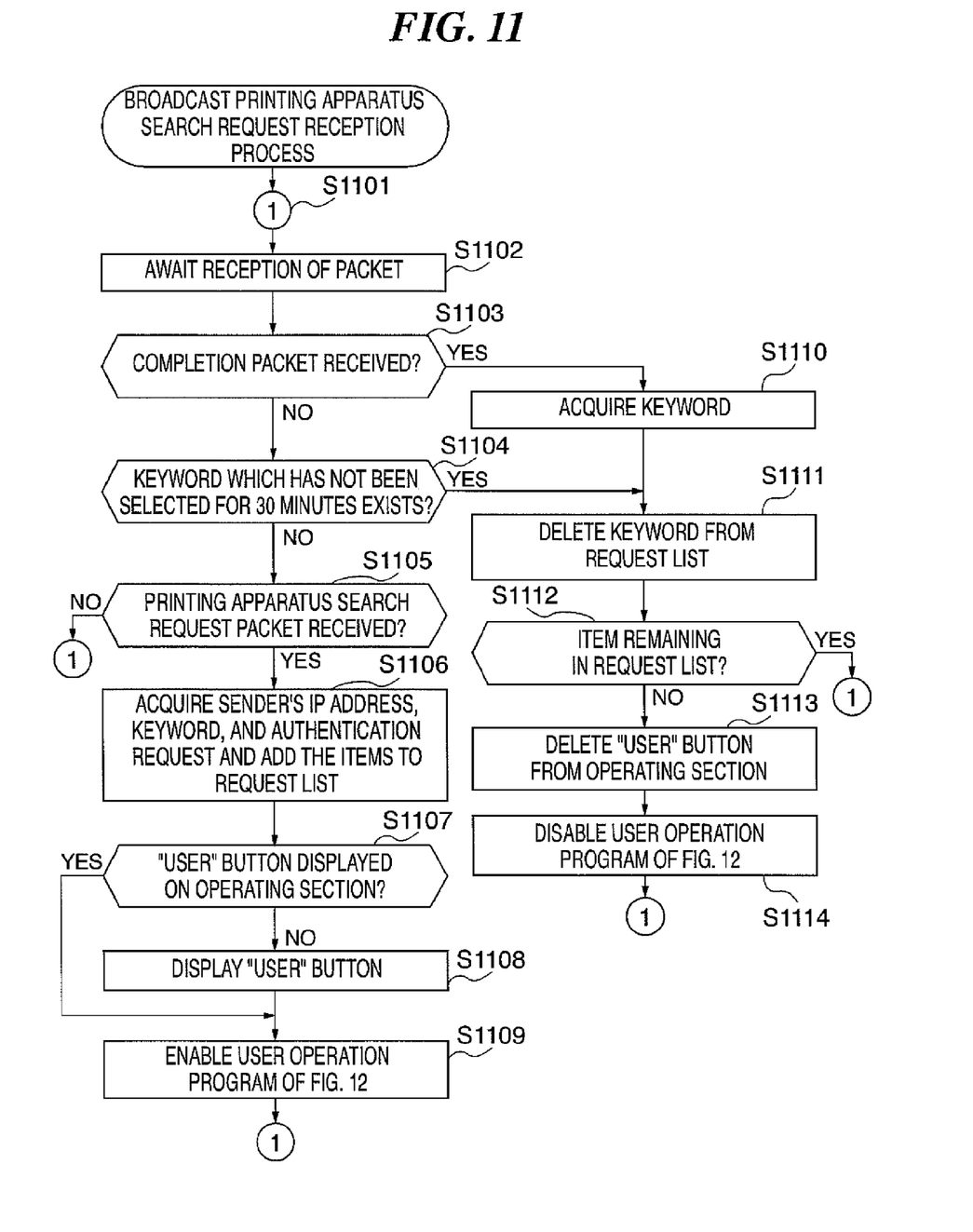
FIG. 11 is a flowchart of a printing apparatus search request reception process executed according to a program operating in the printing apparatus appearing in FIGS. 1A and 1B.

FIG. 11 is a flowchart of a printing apparatus search request reception process executed according to a program operating in the printing apparatus appearing in FIGS. 1A and 1B.

Referring to FIG. 11, the present program is started in a step S1101, and is kept operating during operation of the printing apparatus 104.

In a step S1102, the program awaits reception of the printing apparatus search request packet 401 from the PC 101.

In a step S1103, the printing apparatus 104 determines whether or not the packet received in the step S1102 is the printing apparatus search completion packet 701. If the packet is the printing apparatus search completion packet 701, the process proceeds to a step S1110, whereas if not, the process proceeds to a step S1104.

In the step S1104, the printing apparatus 104 determines whether or not a keyword which has not been selected for 30 minutes exists among items of the search request list 501. If a keyword which has not been selected for 30 minutes exists, the process proceeds to a step S1111, whereas if not, the process proceeds to a step S1105.

In the step S1105, the printing apparatus 104 determines whether or not the packet received in the step S1102 is the printing apparatus search request packet 401. If the packet is the printing apparatus search request packet 401, the process proceeds to a step S1106, whereas if not, the program returns to the step S1101.

In the step S1106, the printing apparatus 104 acquires a sender's IP address, a keyword, and an authentication request from the printing apparatus search request packet 401 acquired in the step S1105. The acquired information items are added to the search request list 501.

In a step S1107, the printing apparatus 104 determines whether or not the "user" button 803 is displayed on the menu screen 801. If the "user" button 803 is displayed on the menu screen 801, the process proceeds to a step S1109, whereas if not, the process proceeds to a step S1108.

In the step S1108, the printing apparatus 104 displays the "user" button 803 on the menu screen 801.

Figure 12:
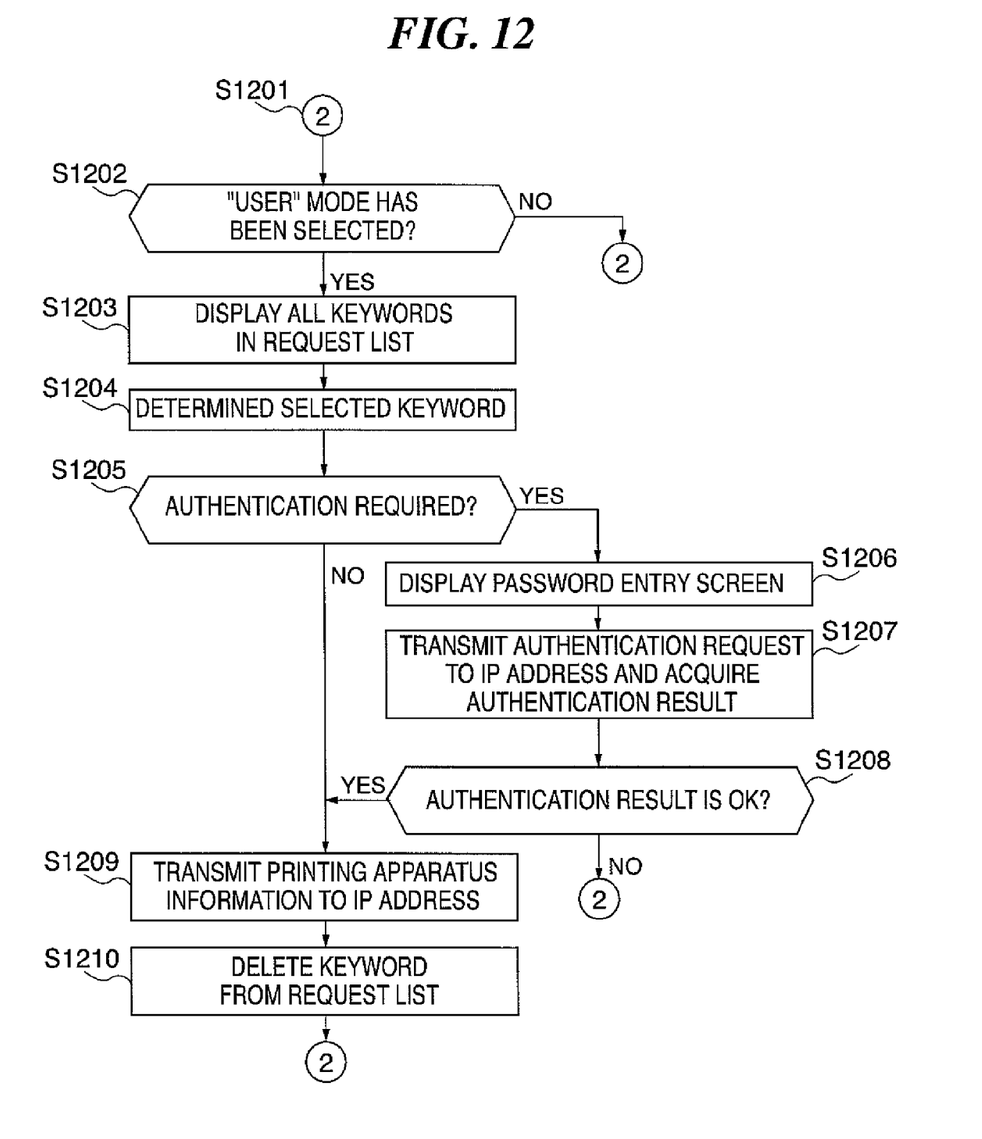
FIG. 12 is a flowchart of processing executed in steps following a step S1109 or S1114 in FIG. 11.

In the step S1109, the printing apparatus 104 enables a user operation program, shown in FIG. 12, on the printing apparatus, followed by the process returning to the step S1101.

In the step S1110, the printing apparatus 104 determines the keyword which has not been selected from the items of the search request list 501 for 30 minutes.

In the step S1111, the printing apparatus 104 deletes an item associated with the keyword determined in the step S1110.

In a step S1112, the printing apparatus 104 determines whether or not there is an item remaining in the search request list 501. If there is an item remaining in the search request list 501, the process returns to the step S1101, whereas if not, the process proceeds to a step S1113.

In the step S1113, the printing apparatus 104 deletes the "user" button 803 from the menu screen 801 of the printing apparatus.

In a step S1114, the printing apparatus 104 disables the user operation program, shown in FIG. 12, on the printing apparatus, followed by the process returning to the step S1101.

FIG. 12 is a flowchart of processing executed in steps following the step S1109 or S1114 in FIG. 11.

The present program is started in a step S1201.

In a step S1202, the printing apparatus 104 determines whether or not a user mode has been selected. More specifically, the printing apparatus determines whether or not the "user" button 803 in FIG. 8A has been selected by a user. If the "user" button 803 in FIG. 8A has been selected, the process proceeds to a step S1203, whereas if not, the process returns to the step S1201.

In the step S1203, all keywords in the search request list 501 are displayed on the menu screen 801 of the printing apparatus 104.

In a step S1204, the printing apparatus 104 determined a keyword selected by the user. More specifically, the printing apparatus 104 determines which of keyword display sections 805 in FIG. 8B is selected by the user.

In a step S1205, the printing apparatus 104 refers to the search request list 501 and determines whether or not an item of the password authentication ON/OFF-setting section 504 associated with the keyword acquired in the step S1204 requires password authentication. If password authentication is required, the process proceeds to a step S1206, whereas if not, the process proceeds to a step S1209.

In the step S1206, the printing apparatus 104 displays the password entry screen 806 shown in FIG. 8C, so as to prompt the user to enter a password.

In a step S1207, the printing apparatus 104 refers to the search request list 501 and acquires the IP address associated with the keyword acquired in the step S1204. Then, the printing apparatus 104 transmits an authentication request to the acquired IP address and acquires the result of the authentication. The data for requesting authentication is transmitted in an encrypted form.

In a step S1208, the printing apparatus 104 determines whether or not the result of the authentication acquired in the step S1207 is OK. If the result of the authentication is OK, the process proceeds to the step S1209, whereas if not, the process returns to the step S1201.

In the step S1209, the printing apparatus 104 refers to the search request list 501 and transmits a printing apparatus information packet 601 to the acquired IP address associated with the keyword determined in the step S1204.

In a step S1210, the printing apparatus 104 deletes the associated items including the keyword determined in the step S1204, from the search request list 501, followed by the process returning to the step S1201.

It should be noted that the time period used as a reference for determination in the step S1104 in FIG. 11 is not limited to 30 minutes. Further, this time period may be settable by user input.

Further, although in the above described embodiment, password authentication is performed by a PC when the keyword is input, it may be performed by a printing apparatus. In this case, the printing apparatus receives the value of a password contained in the printing apparatus search request packet 401 and writes the value in the search request list 501. Then, when a user selects specifying information i.e. a keyword in a keyword display section 805 in FIG. 8B and enters a password in the password entry section 807 in FIG. SC, the printing apparatus refers to the search request list 501 and determines whether or not the entered password matches the one associated with the selected specifying information, i.e. the keyword.

Although in the above described embodiment, a printing apparatus is searched for by a host computer, a multifunction machine, a scanner, or a facsimile machine may be searched for. In short, a search target may be any image processing apparatus, such as a printing apparatus, a multifunction machine, a scanner, or a facsimile machine. Further, although in the above described embodiment, a host computer searches for an image processing apparatus, the search may be performed not by the host computer, but by another image processing apparatus.

In the above described embodiment, as shown in FIG. 11, a set of associated items stored in the search request list 501 are deleted when the printing apparatus search completion packet 701 is received and when a timeout occurs. However, a set of associated items in the search request list 501 may be deleted only when the printing apparatus search completion packet 701 is received, or alternatively only when a timeout occurs.

In the above described embodiment, password authentication is employed to realize security function for preventing an information processing apparatus used by a user from being accessed illegally from the outside. However, the present system can also be operated without the password authentication function shown in the above-described embodiment.

Further, it is possible to utilize authentication information for use in logging in to a printing apparatus, in place of the password authentication function shown in the above-described embodiment.

It is to be understood that the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2007-105031 filed Apr. 12, 2007, which is hereby incorporated by reference herein in its entirety.

What is claimed is:

1. An information processing apparatus comprising:
a transmission unit configured to transmit address information of the information processing apparatus and specifying information by which a user identifies the information processing apparatus to a plurality of image processing apparatuses, wherein each of the plurality of image processing apparatuses displays an image processing function thereof and displays in a selectable manner the specifying information transmitted by the transmission unit;
a reception unit configured to receive driver information for identifying a driver associated with a selected image processing apparatus of the plurality of image processing apparatuses, transmitted from the selected image processing apparatus based on the address information and in response to the specifying information being selected by the user at any one of the plurality of image processing apparatuses; and
a second transmission unit configured to be operable when said reception unit receives the driver information from the selected image processing apparatus, to transmit an instruction for deleting the address information and the specifying information transmitted by said transmission unit from a storage unit in each of the plurality of image processing apparatuses, to the plurality of image processing apparatuses.

2. An information processing apparatus as claimed in claim 1,
wherein said transmission unit is configured to transmit a setting for requesting the user to enter a password, together with the address information and the specifying information.

3. An information processing apparatus as claimed in claim 1, wherein the address information is an IP address of the information processing apparatus.

4. An information processing apparatus as claimed in claim 1, wherein the specifying information is information input by the user.

5. An information processing apparatus as claimed in claim 1, wherein the driver information is a printer driver name or a printer driver itself.

6. An image processing apparatus comprising:
a reception unit configured to receive address information of an information processing apparatus from the information processing apparatus, and specifying information by which a user identifies the information processing apparatus;
a first display unit adapted to display an image processing function of the image processing apparatus;
a second display unit configured to display in a selectable manner the specifying information received by the reception unit;
a transmission unit configured to transmit driver information for identifying a driver associated with the image processing apparatus to the information processing apparatus based on the address information and in response to the specifying information displayed by the second display unit being selected by the user;
a storage unit configured to store the address information and the specifying information received by said reception unit;
a second reception unit configured to receive, from the information processing apparatus, an instruction for deleting the address information and the specifying information from said storage unit; and
a deleting unit configured to be operable when the instruction is received by said second reception unit, to delete the address information and the specifying information from said storage unit.

7. An image processing apparatus as claimed in claim 6, wherein
the deleting unit is configured to be operable when the specifying information has not been selected by a user for a predetermined time period after the address information and the specifying information were received by said reception unit, to delete the address information and the specifying information from said storage unit.

8. An image processing apparatus as claimed in claim 6, further comprising a third display unit configured to be operable when the specifying information displayed by said second display unit is selected by a user, to display a screen for requesting the user to enter a password.

9. An image processing apparatus as claimed in claim 6, wherein the address information is an IP address of the information processing apparatus.

10. An image processing apparatus as claimed in claim 6, wherein the specifying information is information input by the user.

11. An image processing apparatus as claimed in claim 6, wherein the driver information is a printer driver name or a printer driver itself.

12. A method of controlling an information processing apparatus, the method comprising:

a transmission step of transmitting address information of the information processing apparatus and specifying information by which a user identifies the information processing apparatus to a plurality of image processing apparatuses, wherein each of the plurality of image processing apparatuses displays an image processing function thereof and displays in a selectable manner the transmitted specifying information;
a reception step of receiving driver information for identifying a driver associated with a selected image processing apparatus of the plurality of image processing apparatuses, transmitted from the selected image processing apparatus based on the address information and in response to the specifying information being selected by the user at any one of the plurality of image processing apparatuses; and
a second transmission step of, when the driver information is received in said reception step from the selected image processing apparatus, transmitting an instruction for deleting the address information and the specifying information transmitted in said transmission step from a storage unit in each of the plurality of image processing apparatuses, to the plurality of image processing apparatuses.

13. A non-transitory computer-readable storage medium storing a program for causing at least a computer to control an information processing apparatus, the program comprising:
a transmission module configured to transmit address information of the information processing apparatus and specifying information by which a user identifies the information processing apparatus to a plurality of image processing apparatuses, wherein each of the plurality of image processing apparatuses displays an image processing function thereof and displays in a selectable manner the specifying information transmitted by the transmission module;
a reception module configured to receive driver information for identifying a driver associated with a selected image processing apparatus of the plurality of image processing apparatuses, transmitted from the selected image processing apparatus based on the address information and in response to the specifying information being selected by the user at any one of the plurality of image processing apparatuses; and
a second transmission module configured to be operable when said reception module receives the driver information from the selected image processing apparatus, to transmit an instruction for deleting the address information and the specifying information transmitted by said transmission module from a storage unit in each of the plurality of image processing apparatuses, to the plurality of image processing apparatuses.

14. A method of controlling an image processing apparatus, the method comprising:
a reception step of receiving address information of an information processing apparatus from the information processing apparatus, and specifying information by which a user identifies the information processing apparatus;
a first display step of displaying an image processing function of the image processing apparatus;
a second display step of displaying in a selectable manner the specifying information received in the reception step;
a transmission step of transmitting driver information for identifying a driver associated with the image processing apparatus to the information processing apparatus based on the address information and in response to the specifying information displayed in the second display step being selected by the user;

a storage step of storing the address information and the specifying information received in said reception step in a storage unit;

a second reception step of receiving, from the information processing apparatus, an instruction for deleting the address information and the specifying information from said storage unit; and a deleting step of, when the instruction is received in said second reception step, to delete the address information and the specifying information from said storage unit.

15. A non-transitory computer-readable storage medium storing a program for causing at least a computer to control an image processing apparatus, the program comprising:

a reception module configured to receive address information of an information processing apparatus from the information processing apparatus, and specifying information by which a user identifies the information processing apparatus;

a first display module adapted to display an image processing function of the image processing apparatus;

a second display module configured to display in a selectable manner the specifying information received according to the reception module;

a transmission module configured to transmit driver information for identifying a driver associated with the image processing apparatus to the information processing apparatus based on the address information and in response to the specifying information displayed according to the second display module being selected by the user;

a storage module configured to store the address information and the specifying information received by said reception module in a storage unit;

a second reception module configured to receive, from the information processing apparatus, an instruction for deleting the address information and the specifying information from said storage unit; and a deleting module configured to be operable when the instruction is received by said second reception module, to delete the address information and the specifying information from said storage unit.

* * * * *